United States Patent
Ryden et al.

(10) Patent No.: US 8,210,568 B2
(45) Date of Patent: Jul. 3, 2012

(54) VEHICLE SEAT UNIT

(75) Inventors: Timo Ryden, Älvängen (SE); Jonas Björkqvist, Billdal (SE); Magnus Karisson, Göteborg (SE); Joachim Huber, Kirchdorf (DE); Lars Kauffeld, München (DE)

(73) Assignees: Autoliv Development AB, Vargarda (SE); Bayerische Motorenwerke Aktiengesellschaft, Munich (DE)

( * ) Notice: Subject to any disclaimer, the term of this patent is extended or adjusted under 35 U.S.C. 154(b) by 575 days.

(21) Appl. No.: 11/629,024

(22) PCT Filed: Jun. 3, 2005

(86) PCT No.: PCT/EP2005/005975
§ 371 (c)(1),
(2), (4) Date: Aug. 14, 2009

(87) PCT Pub. No.: WO2005/120906
PCT Pub. Date: Dec. 22, 2005

(65) Prior Publication Data
US 2010/0007119 A1    Jan. 14, 2010

(30) Foreign Application Priority Data
Jun. 8, 2004 (DE) .................. 20 2004 009 002 U

(51) Int. Cl.
*B60R 21/207* (2006.01)

(52) U.S. Cl. .................. 280/730.2; 280/728.2; 280/740; 280/742

(58) Field of Classification Search ............... 280/730.2, 280/728.2, 736, 740, 742, 730.1; *B60R 21/207*
See application file for complete search history.

(56) References Cited

U.S. PATENT DOCUMENTS

| 5,704,637 A | 1/1998 | Matsuura et al. |
| 6,349,964 B1 | 2/2002 | Acker et al. |

FOREIGN PATENT DOCUMENTS

| DE | 29601257 U1 | 1/1996 |
| DE | 19925441 A1 | 6/1999 |
| EP | 0 724 986 A2 | 1/1996 |
| EP | 0 800 960 A2 | 10/1997 |
| EP | 0 844 145 A2 | 5/1998 |
| GB | 2293355 A | 3/1996 |
| JP | 2004-166452 | 6/1992 |
| JP | 2000-95049 | 4/2000 |
| JP | 2004148879 | 5/2004 |

*Primary Examiner* — Faye M Fleming
*Assistant Examiner* — Keith Frisby
(74) *Attorney, Agent, or Firm* — Brinks Hofer Gilson & Lione

(57) ABSTRACT

A side airbag unit for a vehicle seat including a generally cylindrical gas generator unit having a longitudinal axis. The vehicle seat has a backrest with a front surface and a side surface. In order to achieve the result that the airbag requires little additional space and nevertheless is relatively easy to mount on the vehicle seat, the longitudinal axis extends generally parallel to the front surface and perpendicular to the side surface of the vehicle seat.

7 Claims, 3 Drawing Sheets

VEHICLE SEAT UNIT

CROSS REFERENCE TO RELATED APPLICATIONS

This application claims priority to German patent application serial number 20 2004 009 002.3, filed Jun. 8, 2004 and PCT/EP2005/005975, filed Jun. 3, 2005.

BACKGROUND

1. Field of the Invention

The invention relates to motor vehicle safety devices. More particularly, it relates to a vehicle seat including a side impact airbag unit.

2. Description of Related Art

Vehicle seats with side airbag units are known to protect vehicle occupants in case of a side collision. In these, the side airbag unit, mainly consisting of an airbag and a gas generator, is located in the area of the side surface of a backrest of the vehicle seat. The airbag inflates between the occupant and an inner structure of the vehicle in case of need. The gas generator is attached to the frame of the vehicle seat by means of a retaining element, whereby the longitudinal axis of the gas generator, which is generally of cylindrical form, extends substantially vertically and parallel to the side surface of the seat. Within this arrangement, the gas generator is basically completely surrounded by the airbag, which allows rapid filling of the airbag. Although this arrangement of the airbag is relatively simple, it has the disadvantage that additional space is needed outside the frame of the seat, which is often not available, particularly in the case of sports cars, roadsters and cabriolets.

One known solution is to provide a vehicle seat in which a gas generator is accommodated inside a hollow tube of the frame of the seat. However, while such a solution is very space-saving, it is also very complicated.

The object of the present invention is to improve a vehicle seat unit in such a way that the side airbag unit only needs a little additional space and nevertheless can be easily mounted on the vehicle seat.

SUMMARY OF THE INVENTION

The solution according to the present invention is based on a different installation geometry of the gas generator. The longitudinal axis of a basically cylindrical gas generator basically runs horizontally and perpendicular to the side surface of the vehicle seat, so that the gas generator can extend wholly or partially into a backrest of the seat in a horizontal axial direction. This results in the desired saving of space.

BRIEF DESCRIPTION OF THE DRAWINGS

Preferred embodiments of the invention are described below with reference to the drawings. The drawings are as follows.

DETAILED DESCRIPTION

Figure 1:
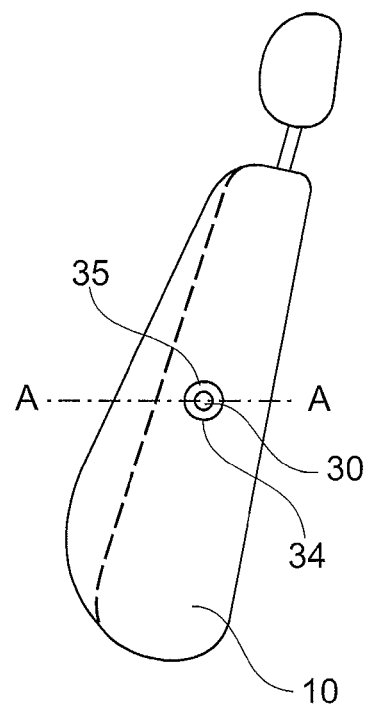
FIG. 1 is a side view of a backrest of a motor vehicle seat.

FIG. 1 shows a vertical section through a backrest 10 of a vehicle seat assembly. A cylindrical gas generator 30 is accommodated in backrest 10, whose longitudinal axis extends horizontally and parallel to a front surface 12 of backrest 10. Gas generator 30 is surrounded concentrically by sleeve 34, whereby an annular gap 35 is present in a front area between gas generator 30 and sleeve 34. In case of activation, gas streams from gas outlet openings of the gas generator through that annular gap into the airbag, as can clearly be seen from FIG. 2.

Figure 2:
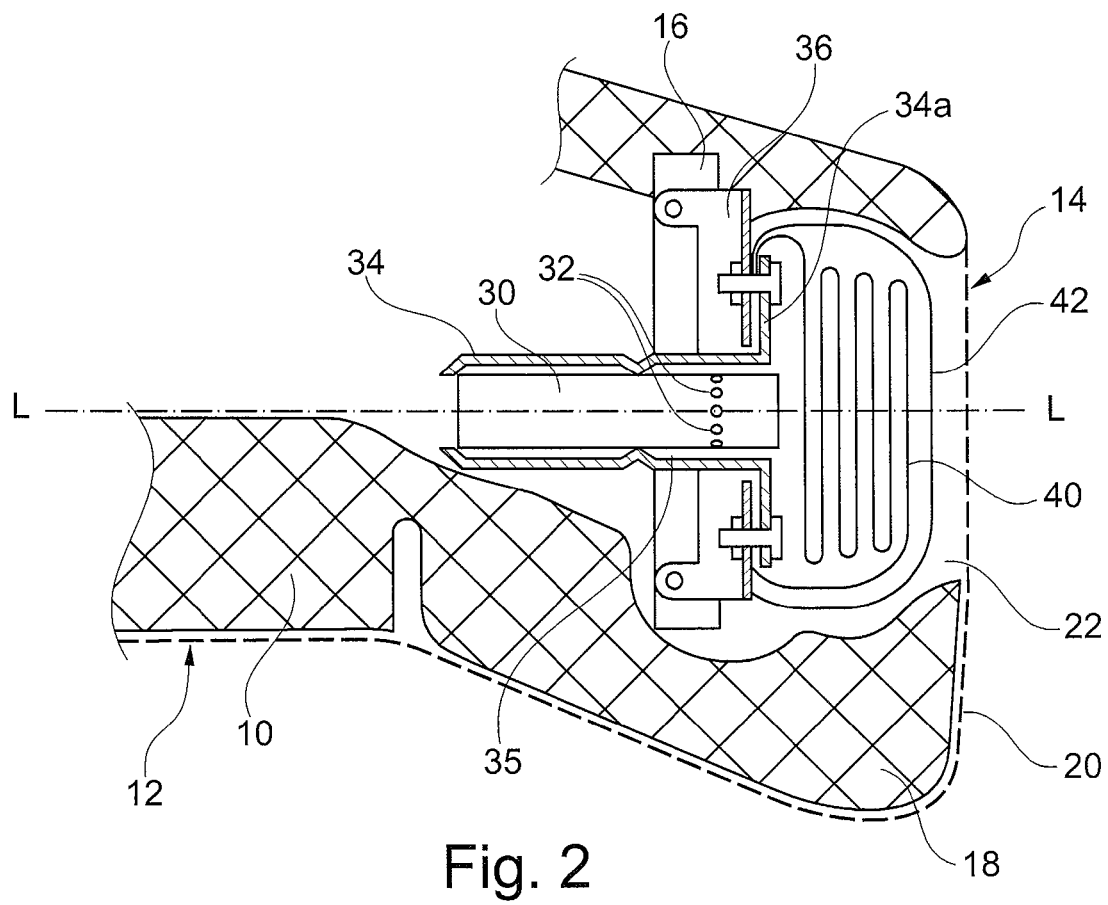
FIG. 2 is a top view of a part of the backrest along section line A-A of FIG. 1.
Figure 4:
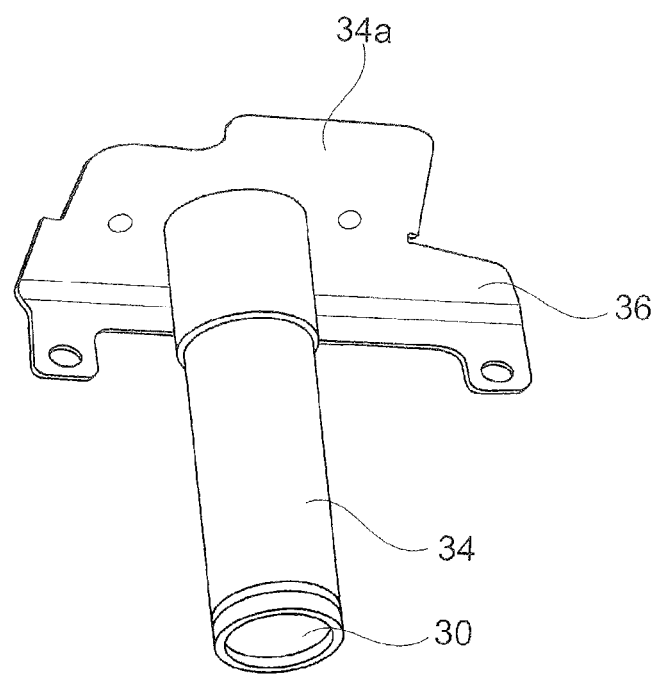
FIG. 4 is a perspective view of a gas generator unit mounted on a mounting plate.

FIG. 2 shows a section through the backrest of FIG. 1 along section line A-A. As already mentioned, gas generator 30 and sleeve 34, which surrounds said gas generator 30, extends into the seat. A longitudinal axis L-L of gas generator 30 and sleeve 34 stands parallel to front surface 12 and basically perpendicular to a side surface 14 of backrest 10. Sleeve 34 is attached, for example, by crimping tightly with gas generator 30, so that sleeve 34 also has the function of securing the gas generator 30 in addition to its function of guiding the gas. This means that sleeve 34 fulfils a double task. In this embodiment, sleeve 34 is attached to an angled mounting plate 36, which in turn is attached to a frame 16 of the backrest. FIG. 4 shows the angled mounting plate 36, sleeve 34 and the rear end of gas generator 30. For this purpose, sleeve 34 widens at its front end to a flange 34a, which lies in a plane which is perpendicular to the longitudinal axis of the gas generator.

In front of gas generator 30, airbag 40, accommodated within an envelope 42, is located in a hollow space 22 of a side bolster 18. When the gas streams in, envelope 42 opens because of the expanding airbag 40, for example, at a set break point (not shown). The airbag then exits from the seat and unfolds between the inner structure of the vehicle and the occupant. A cover 20 of the backrest also exhibits a set break point or a slit for this purpose.

As can be seen in FIG. 2, gas outlet openings 32 are located on a circular ring on the jacket surface of the gas generator 30 running round the longitudinal axis L-L of the gas generator 30. This circular ring lies in a vertical plane, which is perpendicular to the front surface and parallel to the side surface 14 of the backrest 10. In case of activation, the gas streams from here into annular gap 35 formed between gas generator 30 and sleeve 34 and from there into the interior of airbag 40. Therefore, the gas is redirected here from an initially radial flow direction into an axial flow direction. This is necessary, if the gas outlet openings 32 are located outside the interior of the airbag 40, which allows the maximum space saving. In this embodiment, the gas outlet openings lie behind the front surface of mounting plate 36 in the area of frame 16. The rear section of the gas generator 30 extends into an area of the backrest 10 inside frame 16.

Figure 3:
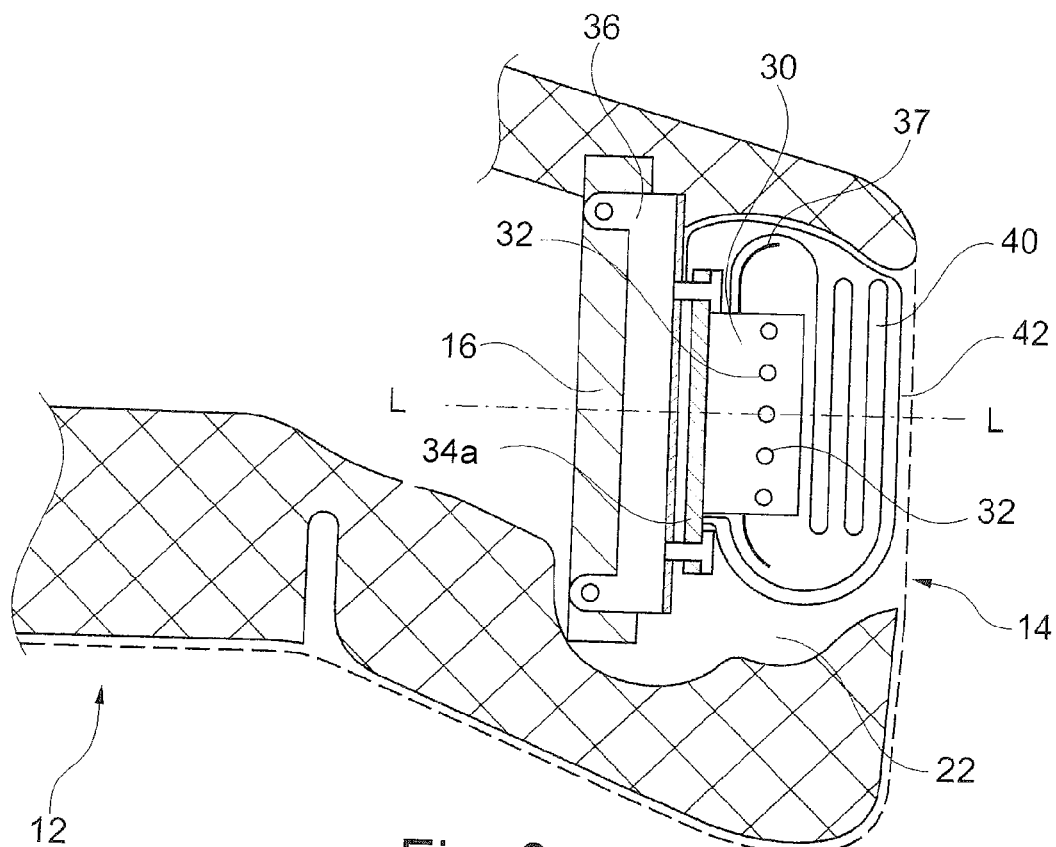
FIG. 3 is a top view of a second embodiment of the backrest along section line A-A of FIG. 1.

FIG. 3 shows an alternate embodiment having a flat, pancake-type gas generator. This alternate gas generator 31 is also cylindrical and its longitudinal axis L-L extends parallel to front surface 12 and basically perpendicular to side surface 14. Here, the geometry is chosen in such a way that gas outlet openings 33 lie inside an airbag 41, so that a sleeve for gas diversion is not necessary. The maximum space-saving which can be achieved is therefore also somewhat less than in the first embodiment. Alternate gas generator 31 exhibits a flange 34b, which is attached together with mounting plate 36. In the area of gas outlet openings 32, a deflector annulus 37 is provided for the protection of the surrounding airbag fabric.

Figure 6:
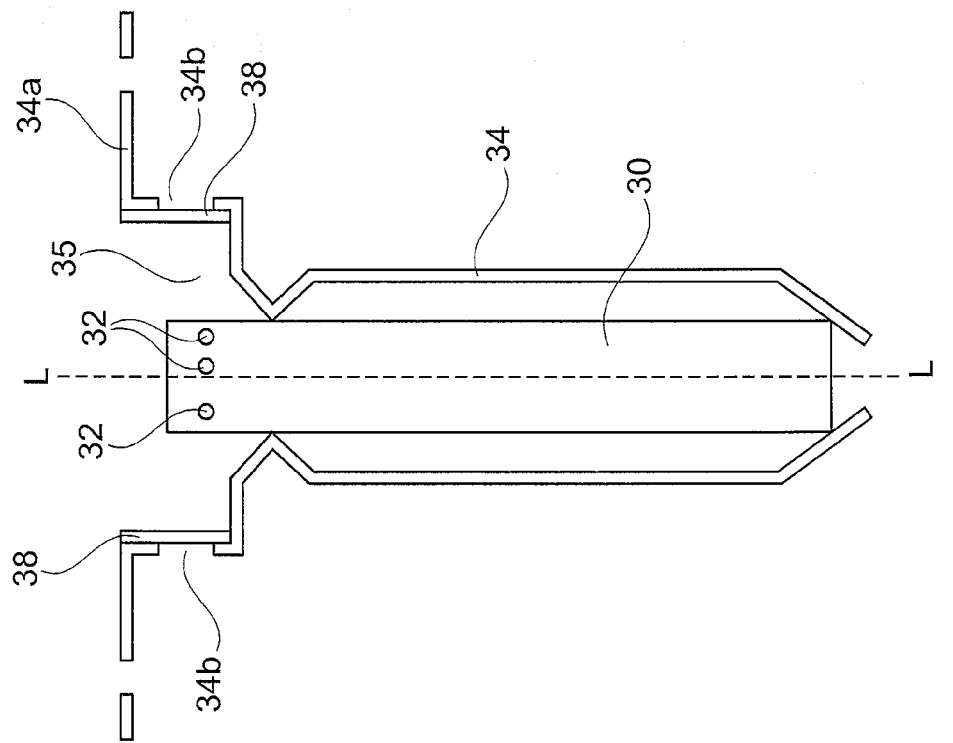
FIG. 6 is a longitudinal section through the sleeve of FIG. 5, showing the gas generator located inside the sleeve.
Figure 5:
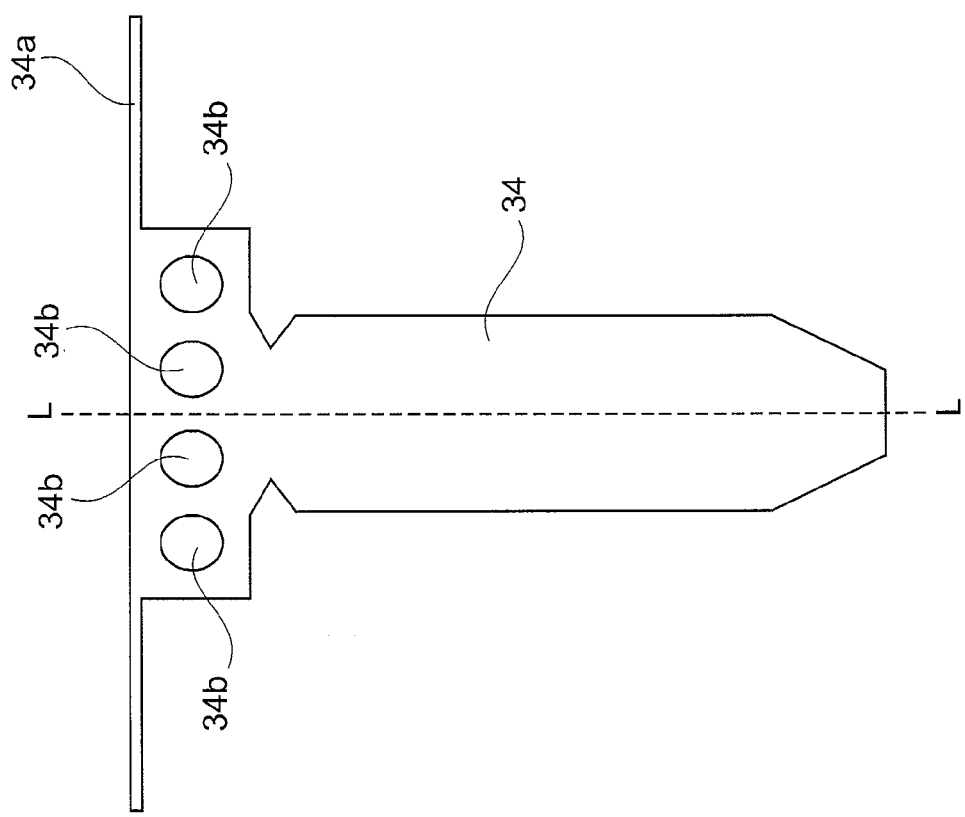
FIG. 5 is a top view of a sleeve for the gas generator.

FIGS. 5 and 6 show an alternative embodiment of the gas generator unit, consisting of sleeve 34 and gas generator 30. FIG. 6 is a longitudinal section through FIG. 5.

The gas generator unit, consisting of sleeve and gas generator, is generally manufactured separately and stored until installation into the backrest 10. The problematical aspect of the gas generator unit shown in FIG. 2 is that it does not behave in a thrust neutral manner. If the gas generator ignites in case of a warehouse fire, gas enters the annular gap 35 and exits in an axial direction, resulting in corresponding acceleration. In the embodiment shown in FIGS. 5 and 6, this effect does not occur, or only in a much reduced form.

Sleeve 34 consists, as also in the previous embodiments, of metal. In the area of annular gap 35, it exhibits through-holes 35a which face the gas outlet opening 32. These through-holes 35a are covered by a plastic ring 38, forming a plastic element. The material and thickness of this plastic ring 38 are selected in such a way that it retains its stability for the period of operation of the gas generator. However, should a warehouse fire occur, plastic ring 38 melts and reveals the through-holes 35a, so that a large proportion of the gases coming from gas outlet openings 32 escapes through these symmetrically arranged through-holes 35a. This means that the gas generator unit basically behaves in a way which is thrust neutral. As an alternative to this it could be imagined that the entire sleeve 34 or at least the area of the annular gap of sleeve 34 could be manufactured of plastic, which loses its stability in case of fire. The embodiment shown here has, however, the advantage of greater overall mechanical stability.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A side airbag module for a vehicle seat assembly including a vehicle seat and a backrest with a front surface and a side surface, the side airbag module adapted to be mounted within the backrest, the airbag module comprising a gas generator unit having a cylindrical gas generator defining a longitudinal axis, the longitudinal axis extending substantially parallel to the front surface and substantially perpendicular to the side surface of the backrest, and further comprising an airbag arranged between the gas generator and the side surface, the gas generator being configured to inflate the airbag and extending along the longitudinal axis and including a sleeve which at least encloses some sections of the gas generator, the sleeve having a flange at one end facing the side surface of the backrest, the flange being attached to a mounting plate which is in turn mounted on a frame of the backrest.

2. The side airbag module according to claim 1, wherein gas outlet openings of the gas generator lie on a circular line on a jacket surface of the gas generator so as to be symmetrical as regards rotation in relation to the longitudinal axis, in such a way that the circular line lies in a plane substantially perpendicular to the front surface and parallel to the side surface of the backrest.

3. The side airbag module according to claim 2, wherein the plane lies adjacent to a frame of the backrest.

4. The side airbag module according to claim 1, wherein at least an area of the gas generator in which gas outlet openings are located is surrounded by the sleeve, whereby an annular gap is formed between gas generator and sleeve through which gas streams into an airbag located in an axial direction in front of the gas generator when the gas generator is activated.

5. The side airbag module according to claim 4, wherein the sleeve is made of metal and proximal to the annular gap and includes through-holes covered by a plastic element.

6. The side airbag module according to claim 4, wherein the sleeve is made of plastic at least in the area of the annular gap.

7. The side airbag module according to claim 1, wherein at least a section of the gas generator is located inside the frame within an interior of the backrest.

* * * * *

UNITED STATES PATENT AND TRADEMARK OFFICE
CERTIFICATE OF CORRECTION

| | | |
|---|---|---|
| PATENT NO. | : 8,210,568 B2 | Page 1 of 1 |
| APPLICATION NO. | : 11/629024 | |
| DATED | : July 3, 2012 | |
| INVENTOR(S) | : Timo Ryden et al. | |

It is certified that error appears in the above-identified patent and that said Letters Patent is hereby corrected as shown below:

On the Title Page

Left column, item (75), after "Billdal (SE);" replace "Magnus Karisson," with --Magnus Karlsson,--.

Signed and Sealed this
Sixth Day of November, 2012

David J. Kappos
*Director of the United States Patent and Trademark Office*